United States Patent [19]

Thonebe et al.

[11] Patent Number: 5,586,431
[45] Date of Patent: Dec. 24, 1996

[54] AIRCRAFT NACELLE VENTILATION AND ENGINE EXHAUST NOZZLE COOLING

[75] Inventors: Douglas A. Thonebe, Jupiter; Russell L. Coons, Palm Beach Gardens, both of Fla.

[73] Assignee: United Technologies Corporation, Hartford, Conn.

[21] Appl. No.: 349,843

[22] Filed: Dec. 6, 1994

[51] Int. Cl.$^6$ .................. F02K 1/12; F02K 3/04
[52] U.S. Cl. .............. 60/226.1; 60/266; 239/127.3
[58] Field of Search ................ 60/39.07, 39.83, 60/226.1, 226.3, 266, 271; 239/127.1, 127.3

[56] References Cited

U.S. PATENT DOCUMENTS 4,544,098  10/1985  Warburton ........................ 239/127.3
5,101,624  4/1992  Nash et al. ........................ 60/266
5,255,849  10/1993  Mayer et al. ..................... 60/266
5,335,489  8/1994  Thayer ............................. 60/266

*Primary Examiner*—Louis J. Casaregola
*Attorney, Agent, or Firm*—Norman Friedland

[57] ABSTRACT

This disclosure relates to a system for purging of the nacelle of an aircraft and for cooling the edge pieces of the divergent flap of a gas turbine engine's two-dimensional exhaust system by use of long tubular air pump with axisymmetric supersonic nozzles, a rectangular mixing chamber for pumping nacelle air with fan discharge air and judiciously flowing the air in separate passageways formed in the double clamshell convergent flap of the exhaust nozzle. This reduces the overall aircraft and weapon system weight, with only a minimum increase in the engine's nozzle weight.

15 Claims, 5 Drawing Sheets

AIRCRAFT NACELLE VENTILATION AND ENGINE EXHAUST NOZZLE COOLING

CROSS REFERENCES

The following patent applications filed on even date relate to this patent application and all are commonly assigned to United Technologies Corporation:

"Exhaust Nozzle Cooling Scheme for Gas Turbine Engine" invented by Daniel E. Eigenbrode and Erik A. Lindstrom;

"Nacelle Air Pump for Vector Nozzles for Aircraft" invented by Mark Stefan Maier, Eric Joseph Gamble, Jack Wilcox Wilson, Eliott Luis Calzadilla and Gerald Frederick Goetz; and "Blind Assembly-Swivel Crossover Tube" invented by Mark Stefan Maier.

TECHNICAL FIELD

This invention relates to the nacelle of the aircraft and the exhaust nozzle of the engine and particularly to an ejector pumping system integrated into the nozzle's convergent and divergent flaps for purging the nacelle and for cooling the edge pieces of the nozzle's divergent flaps.

BACKGROUND ART

As is well known in aircraft technology, it is abundantly important to prevent gasses escaping from the aircraft engine from migrating into the nacelle and accumulating to the point where the gasses would combust and either cause fires or explosions. It is customary to purge the nacelle so as to avoid such occurrences. A current technique for purging the nacelle is to locate a pump adjacent to the exhaust nozzle and pump the ram air that is contained in the nacelle through exhaust ports located at the tail end of the aircraft. Obviously, this entails pressurizing the stagnated gasses to assure that the proper exhaust flow is maintained throughout the operating envelope of the aircraft. The inclusion of a pumping apparatus results in a heavier support structure than is necessary to attain the structural integrity of the engine parts which increases overall engine weight and hence, incurs an engine operating performance deficit.

In certain installations the pumping system is accommodated in the side wall of the nacelle adjacent to the flaps of the 2-dimensional exhaust nozzle. For example the co-pending patent applications mentioned in above integrate the pumping system in the side walls. In other installations the side walls may not be sufficiently large to accommodate the pumping system.

One type of pump heretofore utilized for this purpose is an ejector pump that utilizes fan discharge air as the primary fluid and dumps the entrained nacelle air directly overboard. The use of fan air for this purpose and in this manner penalizes engine performance as the fan air would otherwise be used for generating thrust.

It is also important in this technology to pump nacelle cooling air at flow rates and pressures sufficient to be entrained into the nozzle gaspath flow for cooling the divergent flap edge pieces. Typically, one of two sources have heretofore been utilized for cooling. One of the sources is the fan air which has sufficiently high driving pressures but is at relatively high temperatures which results in poor cooling and as mentioned above comes at the expense of engine performance. The other source is the ambient air that is entrained in the nacelle which has sufficiently low temperatures that would provide efficient cooling, but its pressure is too low for it to penetrate into the engine's gas path and flow therein.

We have found that we can obviate the problems enumerated in the above paragraphs and obtain sufficient cooling of the flap edge pieces and purging of the nacelle without unduly sacrificing engine performance. This invention contemplates an ejector pump integrated into the divergent flap with a mixing chamber that minimizes utilization of fan air and maximizes use of ambient air to attain sufficient flows at the required pressure level and including means for discretely dumping the cooling air in the gaspath. In addition to the pumping system the entire cooling system including the flow paths are integrated into the convergent and divergent flaps of the exhaust nozzle.

SUMMARY OF THE INVENTION

An objective of this invention is to provide improved purging system for the nacelle of an aircraft, so as to prevent fires and explosions from occurring and improved cooling system for the divergent flaps end pieces.

A feature of this invention is to integrate a pumping system within the flap structure of the exhaust nozzle of the engine. Separate passages of fan discharge air and nacelle air are integrated into the flaps and conducted to the divergent flap that houses an ejector pumping system. Discretely positioned discharge passages in the divergent flap expel the cooling air into the gas path along the hot surface of the divergent flaps edge pieces for cooling purposes.

A feature of this invention is the judiciously disposed passages and pumping system integrated into the flaps of the engine's exhaust nozzle in such a way for attaining a low weight system that provides safety features to minimize the observable impacts that are required in certain military aircraft.

Another feature of this invention is to utilize fan discharge air to drive the pump and ambient or nacelle air as the secondary flow for obtaining the desired pressure and flow for divergent flap edge piece cooling.

The foregoing and other features of the present invention will become more apparent from the following description and accompanying drawings.

BEST MODE FOR CARRYING OUT THE INVENTION

Figure 1:
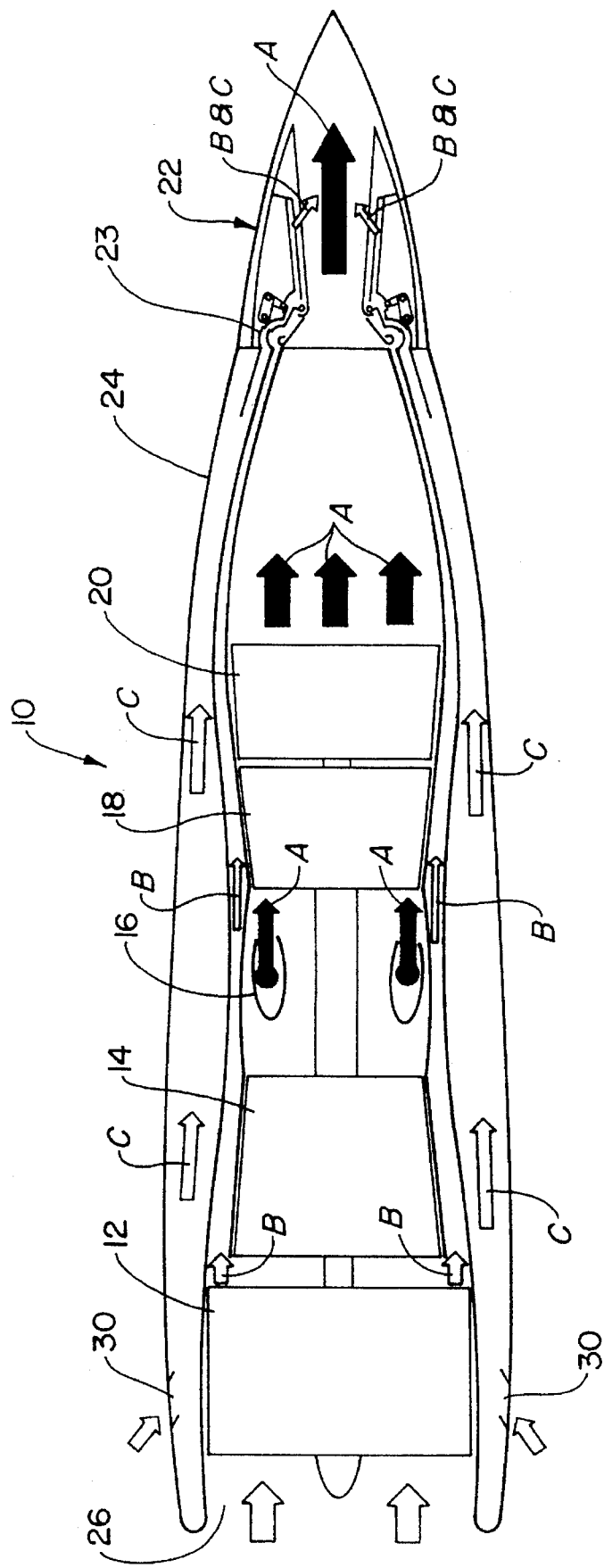
FIG. 1 is a schematic view of a gas turbine engine including thrust vector exhaust nozzle mounted in the nacelle of an aircraft.

Referring to FIG. 1 which is a schematic illustration of the gas turbine engine installed in a nacelle for illustrating the flow path of the air being used by this invention, where the fluid working medium is represented by reference letter A, the fan discharge air is represented by reference letter B and the nacelle or ambient air is represented by reference letter C. As shown in FIG. 1, the gas turbine engine is a twin spool axial flow engine generally illustrated by reference numeral 10 comprising a fan/compressor section 12, a high pressure compressor section 14, the combustion section 16, the high pressure turbine section 18, the low pressure turbine section 20 and the 2-dimensional exhaust nozzle 22. As schematically shown, the engine is installed in the nacelle 24. As is well known the engine develops thrust by ingesting air at the inlet 26 where a portion flows through the fan of the fan/compressor 12 and the remaining portion flows through the compressor section of fan/compressor 12. The fan serves to accelerate the air to produce thrust while a portion of that air is bled from the fan discharge to cool certain components of the engine, as will be described here in below.

The air flowing through the compressor of the fan/compressor 12 is next admitted to the high compressor section 14 where it is further pressurized and accelerated. This air is then delivered to the engine's combustion section 16 where it mixes with fuel and combusts to increase the velocity and temperature of the air. The high temperature gasses serve to power the high pressure turbine 18 and low pressure turbine 20 which, in turn, drive the compressor/fan 12 and high pressure compressor 14. The energy that isn't absorbed by the turbines serves to develop thrust for powering the aircraft, which thrust is enhanced by virtue of the exhaust nozzle 22.

The nacelle includes cavities and flow passages where ambient air is admitted internally through scoops 30 and is discharged from the nacelle as will be described in more detail here in below.

Figure 2:
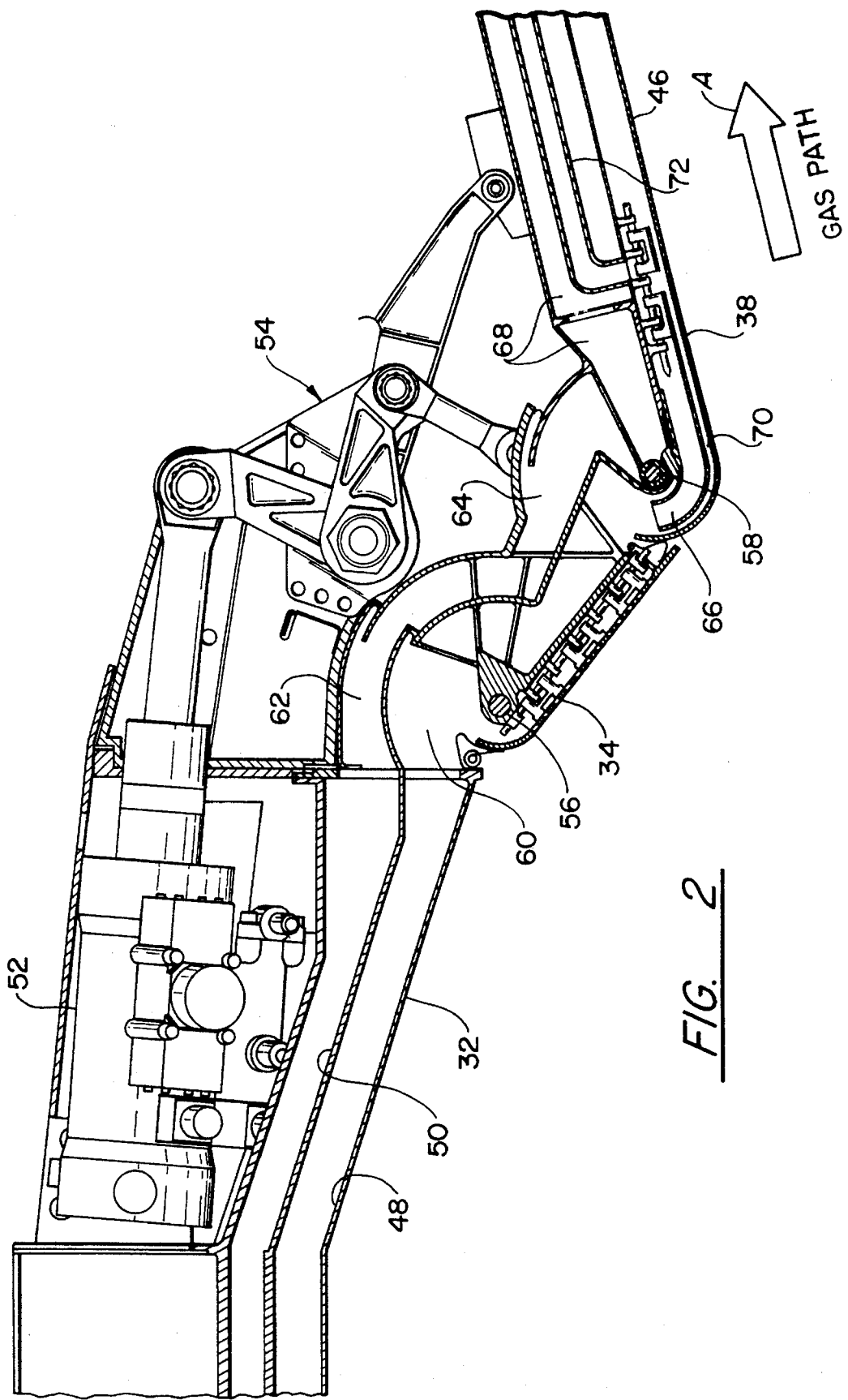
FIG. 2 is a partial view partly, in elevation and partly in section, illustrating a portion of the details of this invention.
Figure 3:
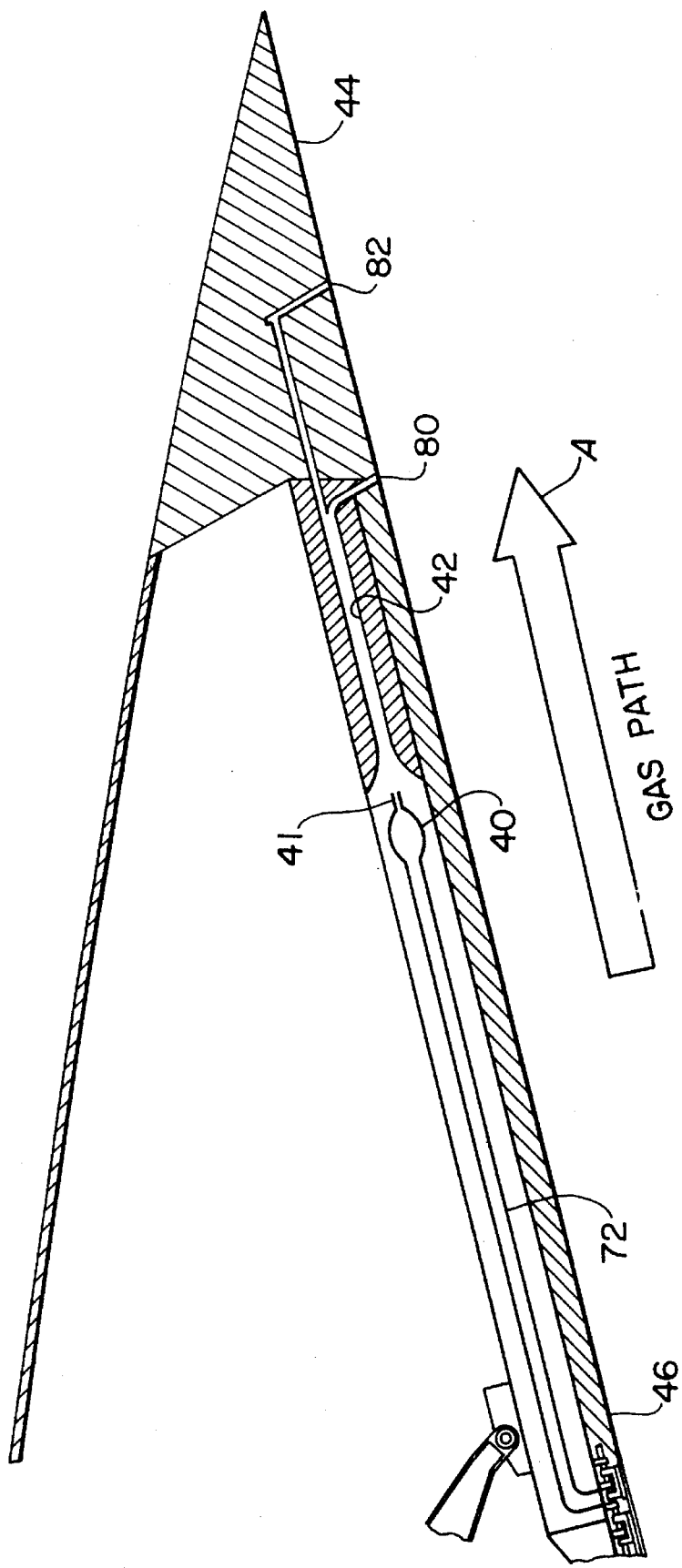
FIG. 3 is a partial view in section illustrating the remaining portion of this invention.
Figure 4:
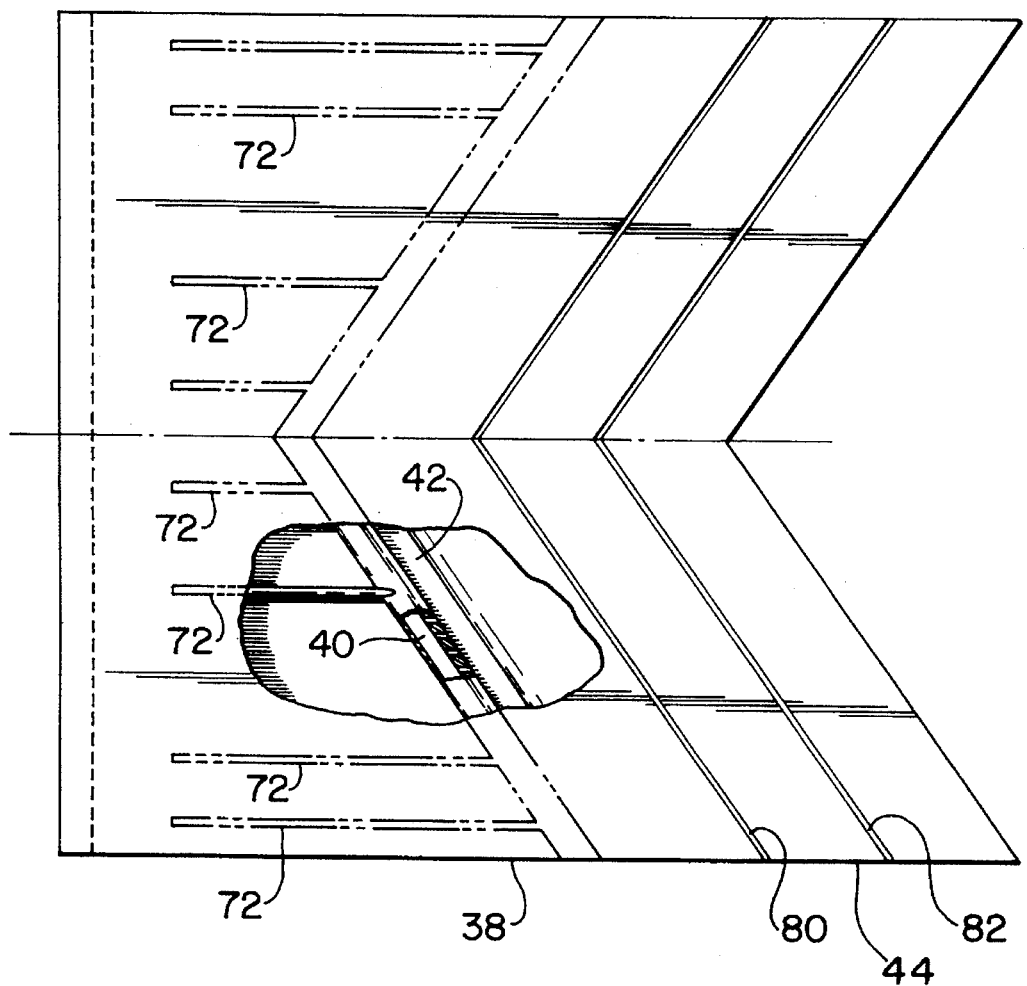
FIG. 4 is a top view of the divergent flaps of the exhaust nozzle incorporating the invention.
Figure 5:
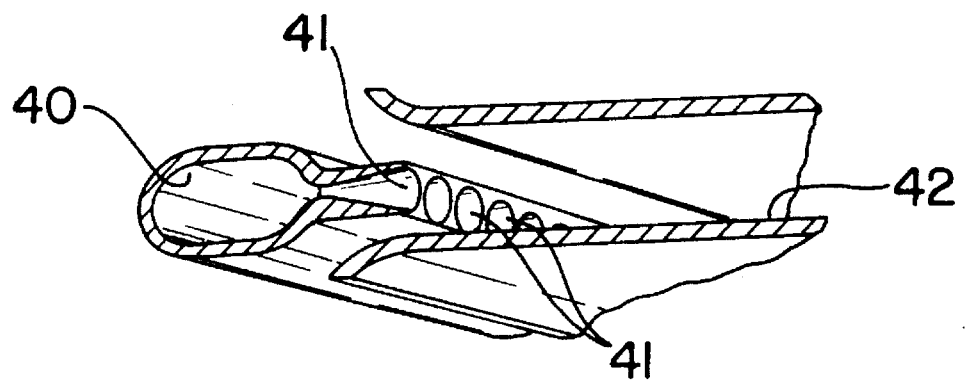
FIG. 5 is a partial view in perspective illustrating the supersonic nozzles.

While this invention is shown in its preferred embodiment as being utilized in a twin spool gas turbine engine, as one skilled in this art will appreciate, this invention can be utilized in other types of engines so long as the engine provided a source of pressurized air. As best seen in FIGS. 2–4, this invention includes an ejector pumping system generally indicated by reference numeral 23 integrated into the flaps of the exhaust nozzle 22 and discrete passages for delivering the fan discharge air and nacelle air to the ejector pumping system. As noted from FIGS. 2–4 there is provided a forward splitter case 32, a "double clamshell" convergent flap 34, divergent flap 38, long tubular air pump with supersonic nozzles 41, rectangular mixing plenum 42, edge piece 44 and hot side liner 46. In accordance with this invention splitter case 32 includes a pair of side by side passages 48 and 50. Nacelle air is extracted from the aircraft's bay and is channeled to the convergent flap 34 through passage 50. A portion of the fan discharge air is likewise channeled to the convergent flap 34 through passage 48.

The "double clamshell" convergent flap and the divergent flap are moveable by the actuator 52 and the cooperating linkages generally illustrated by reference numeral 54 that cause the convergent flap 34 to pivot about hinge 56 and divergent flap 38 to pivot about hinge 58. The operation of the 2-dimensional exhaust nozzle is not necessary for an understanding of this invention and for the sake of convenience and simplicity is omitted herefrom. For more details of the two-dimensional exhaust nozzle reference should be made to U.S. Pat. No. 4,690,329 granted on Sep. 1, 1987 to W. M. Madden and assigned to United Technologies Corporation, the assignee common to the assignee of this patent application and incorporated herein by reference.

As noted from FIG. 2, a pair of side by side curved passages 60 and 62 disposed in convergent flap 34 that bypass the hinge 56 are axially aligned and in fluid communication with passages 48 and 50 respectively to channel the fan discharge air and the nacelle air to the divergent flap 38. It is apparent from the foregoing that the fan discharge air and the nacelle air flow through separate passages in order to keep the flow streams from mixing upstream of the air pump 40 of the pumping system 23. Once the fan discharge air and the nacelle air enter the divergent flap, through passages 66 and 64 respectively, the nacelle air is channeled through cavity 68 and then through the back-structure of the divergent flap, while the fan air follows passage 66 until it is extracted for cooling the hot side liner 70 through cooling holes/slot and conducted to ejector's transfer tubes 72.

The air pump 40 consists of a tubular manifold with a series of axisymmetric supersonic nozzles 41 (one being shown) and preferably cast into a single piece. The mixing plenum 42 is likewise cast in a single piece. The air pumps 40 are driven by the relatively high pressure fan discharge air being channeled through the transfer tubes 72 where the flow is then accelerated through the supersonic nozzles 41 in order to lower the static pressure. This low static pressure together with the interface friction between the high velocity fan discharge air and the low velocity nacelle air serves to pump the relatively lower pressure nacelle air in cavity 68 and drawn into the mixing plenum 42 and ultimately discharging into the engine's gas path via the discharge/diffuser slots 80 and 82 at the optimum static pressure and relative velocities for discharging into the gas path flow indicated by the arrow A. Obviously, the pressure and flow rates are selected to assure that the nacelle is adequately purged and that the flow will be at a sufficiently high pressure and rate to optimally cool the exhaust nozzle 22 divergent flaps 38 edge pieces 44.

In military aircraft applications where 2-dimensional exhaust nozzles are typically utilized the pumping system of this invention in comparison with other pumping systems minimizes both packaging and observable impacts caused by the utilization of a nacelle-bay ejector pump on the exhaust nozzle while allowing the divergent flap edge pieces to be cooled to temperatures that were not attainable heretofore. Another benefit of this invention is the reduced weapon system weight, overall aircraft weight, with only a minimum increase in the engine's nozzle weight.

This invention is particularly efficacious because it utilizes the flap back-structure as the pressure vessel for the nacelle air. Another important aspect of this invention is that the system utilizes locally disposed air transfer tubes to deliver the fan discharge air to power the air pumping system. And another aspect is the manner in which the "clam shell" is modified to incorporate the double chamber in the convergent flap. These features together with the manner in which the fan discharge air and the nacelle air are routed, form a compact and efficient flow design for the pumping system.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A combined purging and cooling system for the nacelle of an aircraft and the edge pieces of the flap of a two-dimensional exhaust nozzle of a gas turbine engine comprising a double clam shell convergent flap and divergent flap, means defining in said convergent flap a pair of side by side passageways, one of said passageways for conducting fan air and the other of said passageways for conducting nacelle air, pumping means including a tubular manifold member and a plurality of supersonic nozzles in said tubular manifold member in fluid communication with said passageway conducting fan air, a cavity adjacent to said other of said passageways in fluid pumping relationship with said supersonic nozzles for pumping said nacelle air, a rectangular mixing plenum in communication with said cavity for mixing the fan air and the nacelle air, transfer means in fluid communication with said rectangular mixing plenum for conducting mixed fan air and nacelle air to the exterior surface of the edge pieces of said exhaust nozzle and a source of fan air and nacelle air.

2. A combined purging and cooling system for the nacelle of an aircraft and the edge pieces of the flap of a two-dimensional exhaust nozzle of a gas turbine engine as claimed in claim 1 wherein said supersonic nozzles are axisymmetrical.

3. A combined purging and cooling system for the nacelle of an aircraft and the edge pieces of the flap of a two-dimensional exhaust nozzle of a gas turbine engine as claimed in claim 2 including a hinge attaching said convergent flap to the two-dimensional exhaust nozzle, said hinge being disposed radially inward relative to said side by side passageways.

4. A combined purging and cooling system for the nacelle of an aircraft and the edge pieces of the flap of a two-dimensional exhaust nozzle of a gas turbine engine as claimed in claim 3 wherein said one of said passageways includes a plurality of tubes.

5. A combined purging and cooling system for the nacelle of an aircraft and the edge pieces of the flap of a two-dimensional exhaust nozzle of a gas turbine engine as claimed in claim 4 wherein said plurality of tubes are disposed in said divergent flap.

6. A combined purging and cooling system for the nacelle of an aircraft and the edge pieces of the flap of a two-dimensional exhaust nozzle of a gas turbine engine as claimed in claim 5 wherein said transfer means includes at least one discharge slot formed in said divergent flaps in fluid communication with said rectangular mixing plenum for leading cooling fluid to the exterior surface of said edge piece.

7. A combined purging and cooling system for the nacelle of an aircraft and the edge pieces of the flap of a two-dimensional exhaust nozzle of a gas turbine engine as claimed in claim 6 wherein said transfer means includes an additional discharge slot in said divergent nozzle in fluid flow relationship with said rectangular mixing plenum disposed in axial spaced relationship with said discharge slot.

8. For the nacelle of an aircraft and the edge pieces of the flap of a two-dimensional exhaust nozzle of a gas turbine engine having a fan including a double clamshell configuration for the convergent and divergent flaps of said 2-dimensional exhaust nozzle comprising an outer skin of the convergent and divergent flaps disposed in the gas path of the engine, said divergent flap being pivotally connected to said 2-dimensional nozzle, said convergent flap having edge pieces and being pivotally connected to said divergent flap, means for imparting rotary motion to said divergent and convergent flaps for varying the geometry of said gas path, means for purging said nacelle and for cooling said edge pieces, said purging and cooling means including a pair of side by side passageways, one of said passageways for conducting fan air and the other of said passageways for conducting nacelle air, pumping means including a tubular manifold member and a plurality of supersonic nozzles in said tubular manifold member in fluid communication with said passageway conducting fan air, a cavity adjacent to said other of said passageways in fluid pumping relationship with said supersonic nozzles for pumping said nacelle air, a mixing plenum in communication with said cavity for mixing the fan air and the nacelle air, transfer means in fluid communication with said mixing plenum for conducting mixed fan air and nacelle air to the exterior surface of the edge pieces of said exhaust nozzle disposed in said gas path.

9. For the nacelle of an aircraft and the edge pieces of the flap of a two-dimensional exhaust nozzle of a gas turbine engine having a fan including a double clam shell configuration for the convergent and divergent flaps of said 2-dimensional exhaust nozzle as claimed in claim 8 wherein said supersonic nozzles are axisymmetrical.

10. For the nacelle of an aircraft and the edge pieces of the flap of a two-dimensional exhaust nozzle of a gas turbine engine having a fan including a double clam shell configuration for the convergent and divergent flaps of said 2-dimensional exhaust nozzle as claimed in claim 8 wherein said mixing chamber is configured in a rectangular shape.

11. For the nacelle of an aircraft and the edge pieces of the flap of a two-dimensional exhaust nozzle of a gas turbine engine having a fan including a double clam shell configuration for the convergent and divergent flaps of said 2-dimensional exhaust nozzle as claimed in claim 10 including a hinge attaching said convergent flap to the two-dimensional exhaust nozzle, said hinge being disposed radially inward relative to said side by side passageways.

12. For the nacelle of an aircraft and the edge pieces of the flap of a two-dimensional exhaust nozzle of a gas turbine engine having a fan including a double clam shell configuration for the convergent and divergent flaps of said 2-dimensional exhaust nozzle as claimed in claim 11 wherein said one of said passageways includes a plurality of tubes.

13. For the nacelle of an aircraft and the edge pieces of the flap of a two-dimensional exhaust nozzle of a gas turbine engine having a fan including a double clam shell configuration for the convergent and divergent flaps of said 2-dimensional exhaust nozzle as claimed in claim 12 wherein said plurality of tubes are disposed in said divergent flap.

14. For the nacelle of an aircraft and the edge pieces of the flap of a two-dimensional exhaust nozzle of a gas turbine engine having a fan including a double clam shell configuration for the convergent and divergent flaps of said 2-dimensional exhaust nozzle as claimed in claim 13 wherein said transfer means includes a discharge slot formed in said divergent flaps in fluid communication with said rectangular mixing plenum for leading cooling fluid to the exterior surface of said edge piece.

15. For the nacelle of an aircraft and the edge pieces of the flap of a two-dimensional exhaust nozzle of a gas turbine engine having a fan including a double clam shell configuration for the convergent and divergent flaps of said 2-dimensional exhaust nozzle as claimed in claim 14 including an additional discharge slot in said divergent nozzle in fluid flow relationship with said rectangular mixing plenum disposed in axial spaced relationship with said discharge slot.

* * * * *